(12) United States Patent
Cooper (10) Patent No.: US 10,331,815 B2
(45) Date of Patent: Jun. 25, 2019

(54) METHODS OF ESTIMATING A PRECURSOR SHAPE FOR A PART TO BE MANUFACTURED

(71) Applicant: ROLLS-ROYCE plc, London (GB)

(72) Inventor: David S Cooper, Derby (GB)

(73) Assignee: ROLLS-ROYCE plc, London (GB)

( * ) Notice: Subject to any disclaimer, the term of this patent is extended or adjusted under 35 U.S.C. 154(b) by 309 days.

(21) Appl. No.: 15/215,070

(22) Filed: Jul. 20, 2016

(65) Prior Publication Data

US 2017/0132336 A1 May 11, 2017

(30) Foreign Application Priority Data

Jul. 29, 2015 (GB) .................................... 1513321.8

(51) Int. Cl.
| | |
|---|---|
| *G06F 7/60* | (2006.01) |
| *G06F 17/10* | (2006.01) |
| *G06F 17/50* | (2006.01) |
| *G01B 21/20* | (2006.01) |
| *G06F 17/11* | (2006.01) |

(52) U.S. Cl.
CPC ......... *G06F 17/5009* (2013.01); *G01B 21/20* (2013.01); *G06F 17/11* (2013.01); *G06F 17/5018* (2013.01); *G06F 2217/12* (2013.01); *G06F 2217/16* (2013.01); *Y02P 90/265* (2015.11)

(58) Field of Classification Search
None
See application file for complete search history.

(56) References Cited

U.S. PATENT DOCUMENTS

| | | | |
|---|---|---|---|
| 2007/0239411 A1* | 10/2007 | Yamashita | G06F 17/5018 703/7 |
| 2009/0319454 A1 | 12/2009 | Regli et al. | |
| 2015/0039247 A1* | 2/2015 | Minote | B21D 22/208 702/42 |

FOREIGN PATENT DOCUMENTS

FR    3 003 668 A1    9/2014

OTHER PUBLICATIONS

*Thales Visionix Inc.*, v. *United States*, United States Court of Appeals for the Federal Circuit, Mar. 8, 2017. (Year: 2017).*
Federal Register, vol. 79, No. 241, Dec. 16, 2014. (Year: 2014).*
Dec. 15, 2016 Search Report issued in European Patent Application No. 16180366.

(Continued)

*Primary Examiner* — Cedric Johnson
(74) *Attorney, Agent, or Firm* — Oliff PLC (57) ABSTRACT

There is disclosed a method of estimating a precursor shape (44, 45) for a part (2) suitable for manufacture via a process selected from a plurality of manufacturing processes. The method includes: generating a convergence line (20) within the confines of a final part shape (1); providing an array (18) of spaced-apart forming shape points (19) around the final part shape (1); converging said points (19) towards the convergence line (20) using a force-energy-balance technique via a movement algorithm; and applying a smoothing algorithm to the converged points (19) to create an estimated precursor shape (44, 45). The algorithms include coefficients specific to a predetermined one of said manufacturing processes.

17 Claims, 10 Drawing Sheets

(56) References Cited

OTHER PUBLICATIONS

Fazli et al., "A Comparison of Numerical Iteration Based Algorithms in Blank Optimization," Finite Elements in Analysis and Design, vol. 50, 2012, pp. 207-216.
Hammami et al., "A Deformation Based Blank Design Method for Formed Parts," Int J Mech Mater Des, vol. 5, 2009, pp. 303-314.
Jan. 20, 2016 Search Report issued in Great Britain Patent Application No. 1513321.8.

* cited by examiner

METHODS OF ESTIMATING A PRECURSOR SHAPE FOR A PART TO BE MANUFACTURED

TECHNOLOGICAL FIELD

This specification relates to a method of estimating a precursor shape for a part to be manufactured, and more particularly relates to a method of estimating a precursor shape for a part suitable for manufacture via a process selected from a plurality of possible manufacturing processes.

BACKGROUND

Computer Aided Process Planning (CAPP) is a generic name for a diverse range of techniques which can be used to take design information for parts, such as engineering components, and create therefrom an appropriate manufacturing route in the form of a set of manufacturing operations which can be used to process raw material in order to produce a desired part. CAPP can be considered to represent an exercise in decision making. The level of human intervention, the extent of the freedom allowed to the computer, the accuracy of any evaluations or simulations the computer is required to run, the acceptable run-time, and the form and extent of the information required by the computer are matters for the CAPP programmer and other decision makers to decide.

The manufacturing methodology used for many intricate and/or high performance parts such as, for example, components of gas turbine engines or the like often involves the formation of a precursor volume via one of a number of possible forming manufacturing processes (e.g. casting and forging). The precursor part produced by the chosen manufacturing process will often be somewhat larger than the desired final shape of the part, and so further processing will then be required (e.g. chip forming operations) to achieve the final desired shape. As will be appreciated, the precursor shape which might be achievable by one manufacturing process will often be somewhat different to that which might be achievable by another manufacturing process.

As will therefore be appreciated, the manufacturing operations which are required to produce any given part will depend on the geometry of the finished part and the shape of the precursor part. It is therefore useful to be able to rapidly estimate the precursor shape which can be created by whatever forming process (e.g. casting or forging) is to be used. In order to optimise the process and cost modelling, it is important to be able to estimate a precursor shape automatically.

It has been previously proposed to estimate a precursor shape via the use of a full rule-based technique, which has been found to be accurate and to require a mid-level of computational complexity. However, this technique is not generic to all part shapes and so requires the formation of a different set of rules for each different part. A different set of rules is also required for each manufacturing process.

It has also been previously proposed to create a precursor shape simply by adding an offset of a few millimeters around the final desired part shape, optionally including the use of a smoothing algorithm or taking account of sharp corners. However, these techniques are considered to be far from optimal.

BRIEF SUMMARY

According to a first aspect of the present proposal, there is provided a method of estimating a precursor shape for a part suitable for manufacture via a process selected from a plurality of manufacturing processes, the method including: generating a convergence line within the confines of a final part shape; providing an array of spaced-apart forming shape points around the final part shape; converging said points towards the convergence line using a force-energy-balance technique via a movement algorithm; and applying a smoothing algorithm to the converged points to create an estimated precursor shape, wherein the algorithms include coefficients specific to a predetermined one of said manufacturing processes.

The method may further include selecting said predetermined manufacturing process from said plurality of manufacturing processes.

The method may include defining said final part shape prior to generation of the convergence line.

Generation of the convergence line may be performed manually or automatically.

Optionally, the ends of said convergence line are proximate, but spaced inwardly of the final part shape.

Said provision of said array of points may be one of: automated; manual; and partially automated.

Each of said forming shape points may be assigned a respective angular value ($\theta$) between 0° and 360°. Optionally, the difference between the angular values ($\theta$) of each neighbouring pair of points is equal.

The angular value ($\theta$) of each forming shape point may remain constant throughout said convergence and smoothing steps.

Said final part shape and said convergence line may be provided within a Cartesian coordinate system, such that the origin of said coordinate system falls within the final part shape.

Optionally, at least some of said forming shape points are moved relative to respective convergence points during said convergence and smoothing, said convergence points being located at discrete positions along said convergence line.

Some of said forming shape points may be moved relative to the same, shared, convergence point, and wherein said shared convergence point is coincident with an end of the convergence line.

The convergence point relative to which each forming shape point is moved during convergence and smoothing may be determined solely in dependence on the angular value ($\theta$) assigned to the respective forming shape point.

The method may further include application of an adaptive grid spacing to maintain said forming shape points in approximately equi-spaced relation to one another during said convergence and smoothing.

Convergence of said forming shape points may involve a primary convergence stage followed by a secondary convergence stage, wherein said primary convergence stage is performed independently of whichever one of said manufacturing processes is selected for manufacture of said part, and wherein said secondary convergence stage involves application of said movement algorithm.

Said movement algorithm may include a plurality of said coefficients.

Said smoothing algorithm may include a single said coefficient.

The method may further include the creation of said final part shape in a CAD package.

The method may also further include the creation of said convergence line in said CAD package.

The method may be implemented on a computer.

According to a second aspect of the present proposal, there is provided an apparatus comprising a processor configured to perform the method of the first aspect.

According to a third aspect of the present proposal, there is provided a computer program which, when read by a computer, causes performance of the method according to the first aspect.

According to a fourth aspect of the present proposal, there is provided a non-transitory computer readable storage medium comprising computer readable instructions which, when read by a computer, cause performance of the method according to the first aspect.

BRIEF DESCRIPTION

So that the proposals may be more readily understood, and so that further features thereof may be appreciated, aspects of the proposals will now be described by way of example with reference to the accompanying drawings in which.

DETAILED DESCRIPTION

Figure 1:
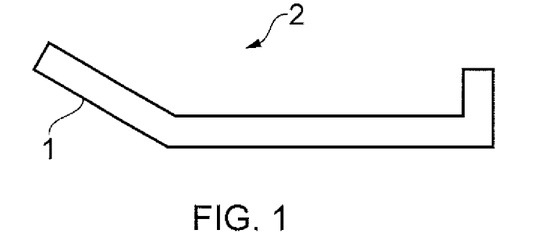
FIG. 1 is a schematic representation of the final two-dimensional shape of an exemplary part whose precursor shape may be estimated via the proposed method.

Turning now to consider the drawings in more detail, FIG. 1 illustrates the final machined part shape 1 of an exemplary part 2 whose precursor shape may be estimated using the method of the present proposal, as will be described in detail below. It is to be noted that the final part shape 1 is thus the final target shape of the part 2 which is to be produced by appropriate forming and machining processes. The particular part 2 whose final part shape 1 is illustrated in FIG. 1 is shown in simplified form for reasons of clarity but may, for example, be an annular casing component for a gas turbine engine. It is to be noted that FIG. 1 represents the two-dimensional final part shape 1 (in radial cross section) of the part 2. The final part shape 1 will typically be created in a Computer Aided Design (CAD) software package in a manner known per se.

Figure 2:
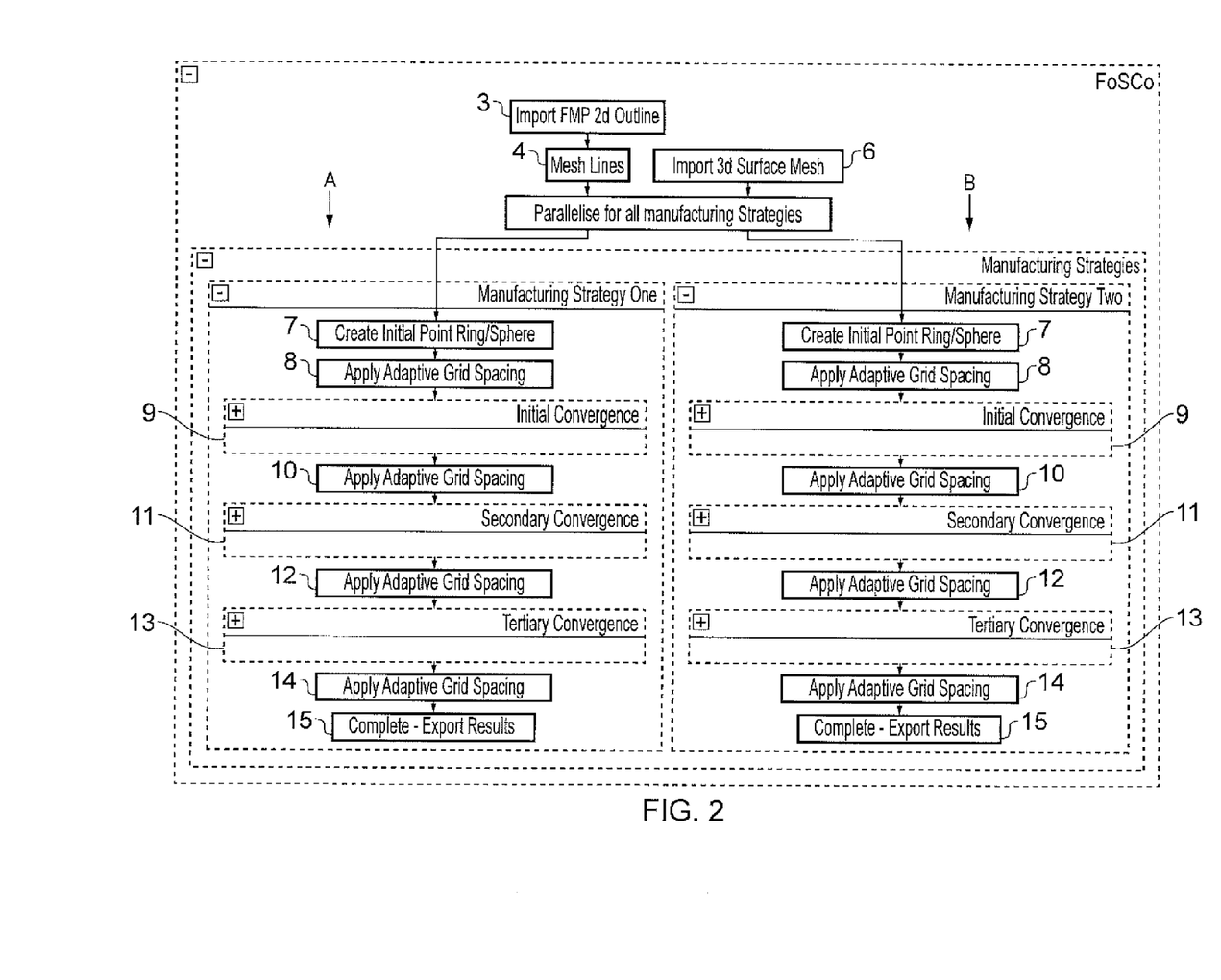
FIG. 2 is a flow diagram representing the overall architecture of the method.
Figure 3:
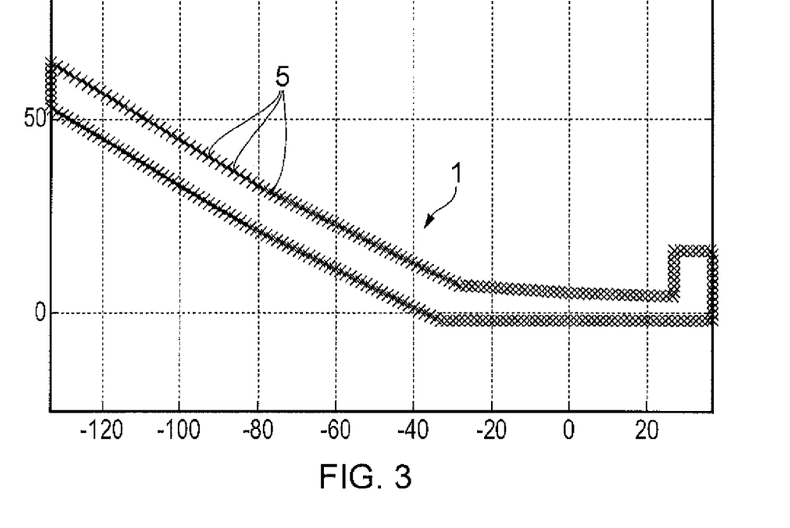
FIG. 3 is a schematic illustration showing a linear mesh of the final part shape illustrated in FIG. 1, the mesh comprising a plurality of equi-spaced points identified by crosses.

FIG. 2 illustrates schematically the overall architecture of a method in accordance with an embodiment of the present proposal. In brief outline, if the final machined part shape 1 which is created in CAD is two-dimensional as illustrated in FIG. 1, then its outline is imported into a computer program configured to implement the method, as denoted at 3 in FIG. 2, whereupon the outline is meshed (as denoted at 4) to create a plurality of equi-spaced final machined part points 5 along the outline of the final part shape 1, as shown schematically in FIG. 3 (each final part point 5 being defined by the intersection of a respective cross). However, it is possible instead to mesh the outline of the final part shape 2 directly within the CAD package prior to import, particularly in the case of a three-dimensional surface shape, as denoted at 6 in FIG. 2.

Following creation and/or importation of the meshed final part shape outline, the method may then be applied in dependence on the particular initial manufacturing process selected to form the precursor part prior to further finishing. FIG. 2 thus illustrates a bifurcation in the process flow into two possible alternative branches A, B, each of which is representative of the method pertaining to a respective manufacturing process. For example, branch A could be considered to represent the method applicable to estimate a precursor shape for a forging process, whilst branch B could be considered to represent the method applicable to create a precursor shape for a casting process. It is to be noted, however, that more than two manufacturing processes could be provided for. It is also to be noted that the subsequent method steps within each branch A, B of the method are generally identical in many respects, and are based on use of the same processes, techniques and algorithms, regardless of which manufacturing process is to be used. As will be described in more detail, however, the implementation of the method will be based on different parameters depending on which manufacturing process is to be used, whilst the algorithms used by the method will remain the same for all possible manufacturing processes.

Braches A and B thus each comprise a series of stages and processes, some of which are optional as will be described in more detail hereinafter, namely:

the creation of an array of spaced-apart forming shape points around the meshed final part shape outline, as denoted at 7;

the application of adaptive grid spacing to the array of forming shape points in order to ensure an even distribution of the points, as denoted at 8;

primary convergence of the forming shape points, performed in an iterative manner, generally towards the final part shape 1, as denoted at 9, further application of adaptive grid spacing to the converged forming shape points to ensure even distribution, as denoted at 10;

secondary convergence of the forming shape points, performed in an iterative manner, generally towards the final part shape 1, as denoted at 11;

further application of adaptive grid spacing to the converged forming shape points to ensure even distribution, as denoted at 12;

tertiary convergence, involving the use of a smoothing algorithm and again performed in an iterative manner, as denoted at 13;

further application of adaptive grid spacing to the converged forming shape points, as denoted at 14; and export of the resulting precursor shape to a CAD package, as denoted at 15, for subsequent automatic creation of reference dimensions to inform a CAPP system how much machining will be necessary to achieve the final part shape 1.

Figure 4:
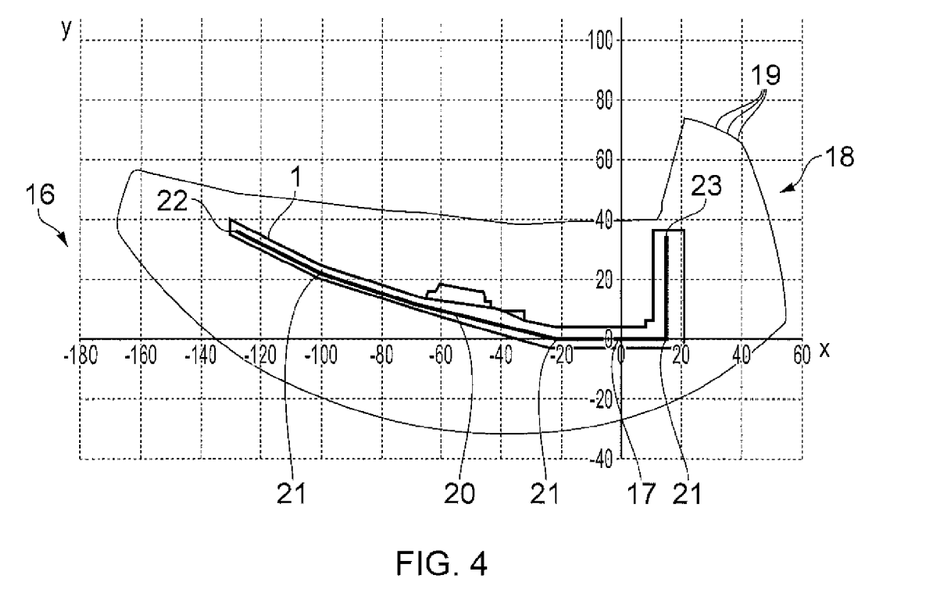
FIG. 4 is a schematic illustration showing a convergence line provided within the confines of the final part shape and an array of spaced-apart forming shape points arranged around the meshed final part shape, prior to any convergence.

Turning now to consider FIG. 4, the meshed final part shape 1 (illustrated in more detail than in FIG. 3) is shown in a native Cartesian coordinate system 16 comprising a horizontal x-axis and a vertical y-axis. The final part shape 1 is located over the origin 17 of the coordinate system. An array 18 of spaced-apart forming shape points 19 is then created around the meshed final part shape 1. In FIG. 4, each forming shape point 19 is denoted by a respective cross, the crosses for each respective point 19 being arranged in a closed contour around and entirely encompassing the meshed final part shape 1 in spaced relation thereto. The forming shape points 19 are thus distributed in the native coordinate system, such that each individual point 19 will have a respective unique (x, y) location within the coordinate system. As will be appreciated, there are a very large number of forming shape points 19 provided in this manner, such that the resolution of FIG. 4 makes it appear that their crosses coalesce to form a thick line. The particular shape of the closed contour array will depend (indirectly) on the final part shape 1, as will be described in more detail hereinafter. It is also to be noted that FIG. 4 depicts the forming shape points 19 in respective starting positions that are considerably closer to the final part shape 1 than would actually be the case in practice, for illustrative purposes. The manner in which the actual starting positions of the forming shape points 19 are determined, and thus also the shape of the initial array 18, will become apparent hereinafter.

As will also be explained in more detail below, the method involves iterative convergence of the forming shape points 19, generally towards the final part shape 1, such that upon completion of the convergence process the locations of the forming shape points 19 will collectively define the outline of a precursor shape for the part which is to be produced. As already indicated above, convergence of the forming shape points 19 may involve a number of discrete stages. For example, in the embodiment of the method illustrated schematically in FIG. 2, the overall convergence process may involve primary convergence, followed by secondary convergence, which is then followed by tertiary convergence via a smoothing algorithm. However, an important aspect of the method is that the forming shape points 19 do not all converge towards the same convergence point. It is this aspect of the method which allows the precursor shape created to be as close as possible to the final part shape 1 in a near net shape manufacturing process.

The method therefore also involves the creation of a convergence line relative to which the forming shape points 19 will each be converged. An exemplary convergence line 20 is illustrated in FIG. 4. It is to be noted that the convergence line 20 is entirely enveloped by the final part shape 1. The convergence line 20 may thus include a number of bends or corners 21 to ensure that it remains within the final part shape 1 at all points along its length. It may alternatively be possible for the convergence line 20 to be curved. The ends 22, 23 of the convergence line 20 should not be too close to each other relative to the origin 17 of the coordinate system 16.

Returning now to consider the forming shape points 19, each point will be assigned a respective and unique fixed angular theta value ($\theta$) of between 0° and 360°, as measured counter-clockwise from a notional horizontal line parallel to the x-axis of the coordinate system 16. For illustrative purposes, an example may be considered in which the closed contour array 18 comprises one-hundred forming shape points 19 (although in practice it is envisaged that many more forming shape points will be used for reasons of accuracy). In such an example: the first forming shape point 19 would thus be assigned a theta value calculated as 1×(360/100), so $\theta_1$=3.6°; the second forming shape point 19 would be assigned a theta value calculated as 2×(360/100), so $\theta_2$=7.2°; the third forming shape point would be assigned a theta value as 3×(360/100), so $\theta_3$=10.8°; and so on. The angular difference between the theta values of each neighbouring pair of forming shape points 19 will thus be equal throughout the full 360° of the closed contour array 18.

Figure 5:
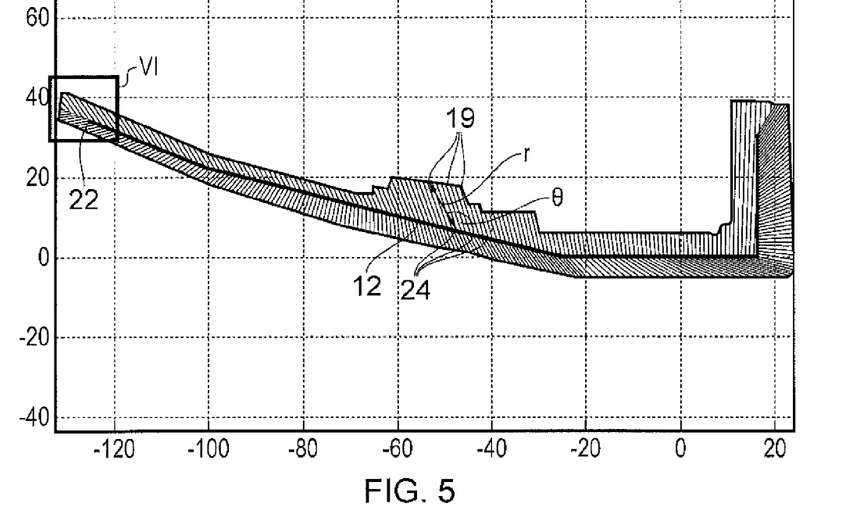
FIG. 5 is a schematic illustration showing the forming shape points at intermediate positions during convergence, and which shows the manner in which the points are moved towards different positions along the convergence line.

As indicated above, convergence of the forming shape points 19 will involve movement of the points relative to the convergence line 20. In this regard, it is to be noted that many of the points 19 will be moved relative to respective and unique convergence points along the convergence line 20, although it is possible that some of the points 19 around the ends 22, 23 of the convergence line 20 will all need to be moved relative to the same end point. This principle can be seen in FIG. 5 which illustrates the forming shape points 19 at a point in time which is part-way through the convergence process. In more detail, each forming shape point is shown connected to its convergence point 24 on the convergence line 20 by a notional line having a length r measured from the respective convergence point 24, and which makes an angle $\theta$ relative to a horizontal line through the convergence point 24, where $\theta$ is the fixed theta value assigned to the respective forming shape point 19. The position of each forming shape point 19 relative to its convergence point 24 may thus be defined by polar coordinates (r, $\theta$). During convergence, as will be explained in more detail below, the theta value $\theta$ of each forming shape point 19 will remain fixed, but the point's r value will change, such that each forming shape point 19 will be moved along its aforementioned notional line.

Figure 6:
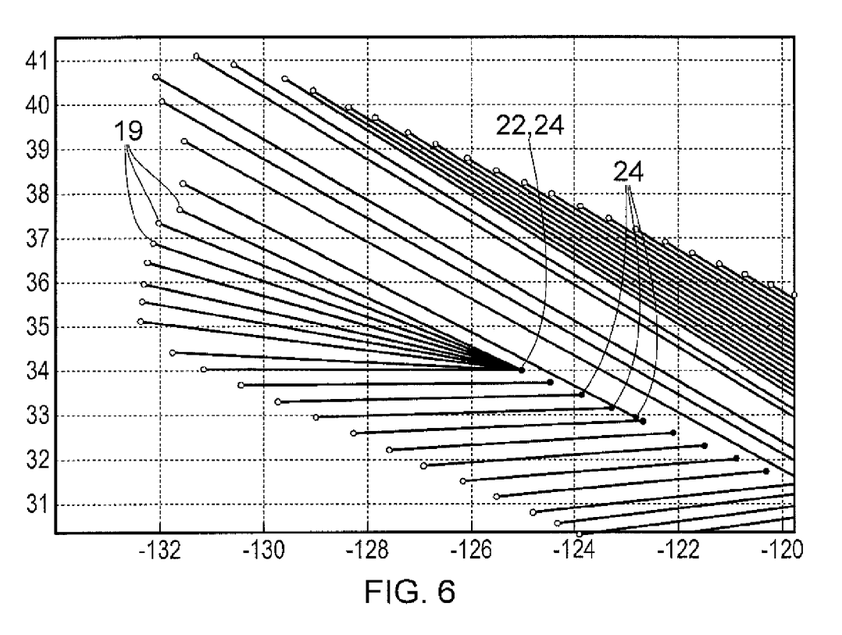
FIG. 6 is an enlarged view of the region VI denoted in FIG. 5, showing in more detail the region of an end of the convergence line.

FIG. 6 illustrates the region of the end point 22 of the convergence line 20 shown in FIG. 6 in more detail, and in particular illustrates how several of the forming shape points 19 around the end of the convergence line will all be converged relative to the same convergence point 24 (coincident with the end of the convergence line 20) despite nevertheless still having different fixed theta values.

As will be appreciated, it is therefore necessary to define a convergence point 24 on the convergence line 20 for each forming shape point 19. In this regard, it is to be noted that the location along the convergence line 20 of the convergence point 24 for any given forming shape point 19 will depend solely on the theta value (θ) assigned to that forming shape point. The process by which this is done will now be described below in more detail.

Figure 7:
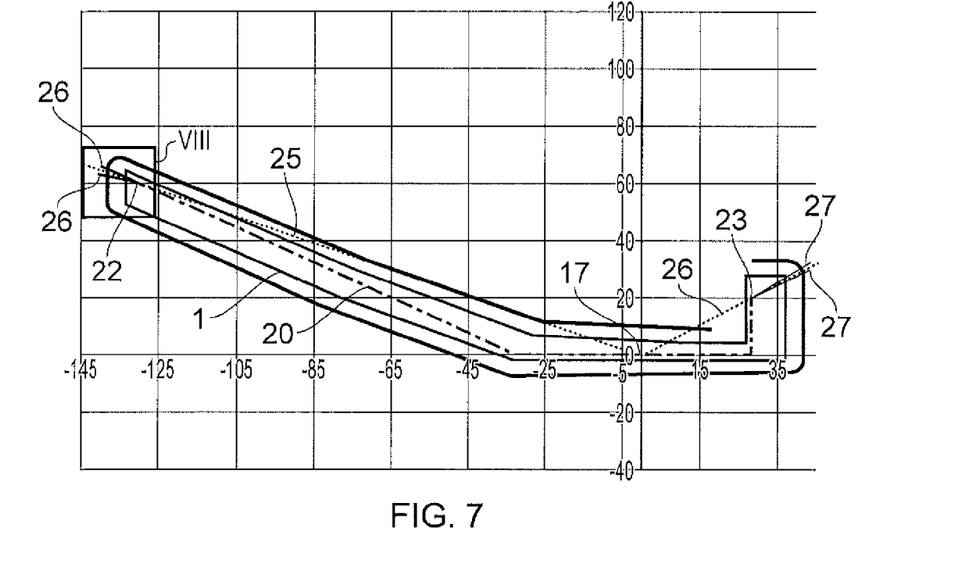
FIG. 7 is a schematic illustration showing principles involved in determining the convergence point on the convergence line to which each forming shape point will move during convergence.
Figure 8:
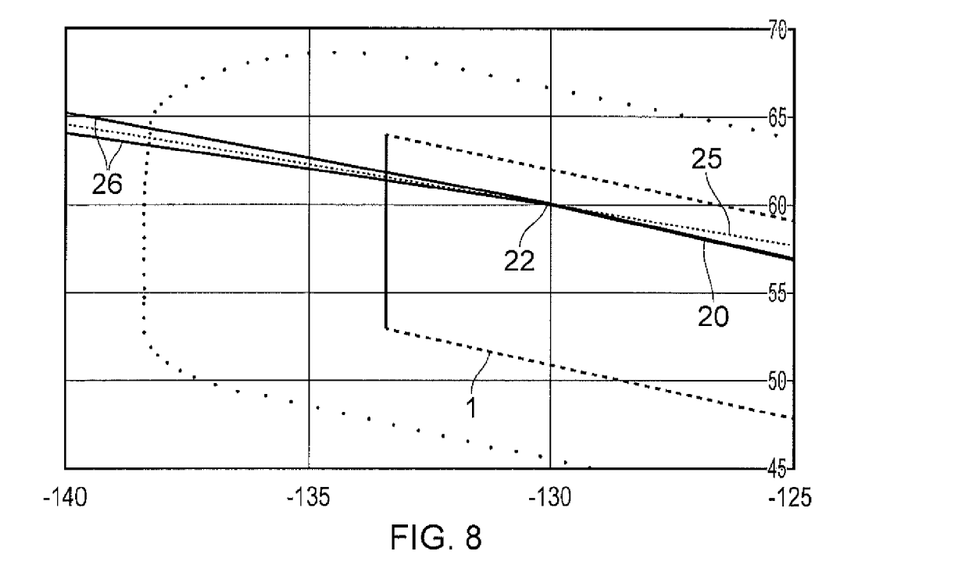
FIG. 8 is an enlarged view of the region VIII denoted in FIG. 7, showing in more detail the region of an end of the convergence line.

When the convergence line 20 is constructed, its end points 22, 23 are each assigned a range of angular values, based on respective lines extending from the origin 17 of the coordinate system 16 and passing through each end point 22, 23 as illustrated in FIGS. 7 and 8, of plus and minus 3°. In FIGS. 7 and 8, the extent of these angular values at each end 22, 23 of the convergence line 20 are denoted by respective pairs of boundary lines 26, 27. The interbound arc angle between the boundary lines 26, 27 of each pair will thus be 6°. Any forming shape point 19 falling between either pair of boundary lines 26, 27 will be converged relative to a convergence point 24 coincident with the respective end point 22, 23 of the convergence line 20.

So, taking the example illustrated in FIGS. 7 and 8, it will be noted that the first end point 22 of the convergence line 20 has Cartesian coordinates of (−130, 60), whilst the second end point has coordinates of (28, 20). The angles from each of these end points, as measured from the positive x-axis of the coordinate system 16 can thus be calculated via trigonometry to be 155.2249° and 35.5378° respectively. Thus, any forming shape points which have a theta value (θ) of 155.2249±3 will take the first end point 22 as their (shared) convergence point, whilst any forming shape points 19 which have a theta value (θ) of 35.5378±3 will take the second end point 23 as their (shared) convergence point.

All of the other forming shape points 19 will lie between one of the boundary lines 26 at the first end 22 of the convergence line 20 and one of the boundary lines 27 at the second end 23 of the convergence line, and their convergence points 24 are determined in dependence on how far between the boundary lines, in an angular sense, the forming shape points 19 lie.

Having regard to FIG. 7, the upper boundary line 27 of the start-point ("sp") end 23 of the convergence line has an angle denoted $sp_{max}$ which in this specific example will be 35.5378+3=38.5378. Similarly, the upper boundary line 26 at the end-point ("ep") 22 of the convergence line 20 has an angle denoted $ep_{min}$ which in this specific example will be 155.2249−3=152.2249.

So for forming shape points located generally above the convergence line 20 shown in FIG. 7, or more accurately between $sp_{max}$ and $ep_{min}$, the position of their respective convergence points 24, as measured along the convergence line 20 from the start-point end 23, may be expressed as a percentage of the total length of the convergence line 20 by the expression:

$$100 \times ((\theta - sp_{max})/(A_{IB}))$$

Where $A_{IB}$ is the interbound arc angle:
(i.e. $ep_{min} - sp_{max}$ or (155.2249−3)−(35.5378+3)=113.6871 degrees in the specific example illustrated).

So, taking an example of a forming shape point 19 having a theta value (θ) of 45°, and the specific convergence line 20 illustrated in FIG. 7 and thus having the above stated $sp_{max}$ and $ep_{min}$ values, then this expression will give a percentage value of 5.68%, such that the forming shape point's convergence point 24 will be located at a position on the convergence line 20 and 5.68% of the total length of the convergence line 20 along the line from the start point 23 of the line.

The same principle may be used to identify which of the convergence points 24 should be used for those forming shape points 19 which are located generally below the convergence line shown in FIG. 7, or more accurately between the lower boundary line 27 of the end-point 23 (having an angle denoted $ep_{max}$) and the lower boundary line 26 of the start-point 22 (having an angle denoted $sp_{min}$). So for forming shape points located generally below the convergence line 20 shown in FIG. 7, or more accurately between $sp_{min}$ and $ep_{max}$, the position of their respective convergence points 24, as measured along the convergence line 20 from the start-point end 23, may be expressed as a percentage of the total length of the convergence line 20 by the expression:

$$100 \times ((\theta - esp_{max})/(A_{IB}))$$

Where $A_{IB}$ in this specific example=32.5378+360−158.2249=234.3129.

When the converging point 24 for each forming shape point 19 is known (as calculated above from the respective theta value of each point 19) then the initial array 18 of forming shape points 19 can be created around the convergence line 20. The forming shape points are positioned relative to their respective convergence points 24 in dependence on their polar coordinates (r, θ), where r is the same for each forming shape point 19.

As indicated above, an adaptive grid spacing (also known as adaptive mesh refinement) technique may optionally be used to ensure that the forming shape points 19 are approximately equi-spaced before and after each stage of convergence. An adaptive grid spacing algorithm may be used which works by identifying the distance between neighbouring forming shape points 19 and comparing the distance to a predetermined minimum spacing m. If the distance between a pair of neighbouring forming shape points 19 is less than the minimum spacing m, then one of the pair of points will be removed from the array 18. Conversely, if the distance between a pair of neighbouring forming shape points 19 is greater than the 2.1m (2.1m being used to avoid the unnecessary computation of adding point in only to take them out shortly after as the shape converges slightly and the points draw closer together) then an additional point will be added to the array 18, the added point having a theta value (θ) mid-way between the theta values of the two points, and a radius r which is an average of the radii of the two points.

FIG. 6 illustrates schematically an optional primary convergence process which may be used to converge the forming shape points 19 generally towards their respective convergence points 24 on the convergence line 20 in a relatively swift manner to reduce the overall time required for convergence, and thus to avoid unnecessary use of processing power. The primary convergence process will be repeated for a number of iterations which, for example, may be between 5 and 10. The flow diagram of FIG. 9 illustrates the stages involved in each iteration.

Figure 9:
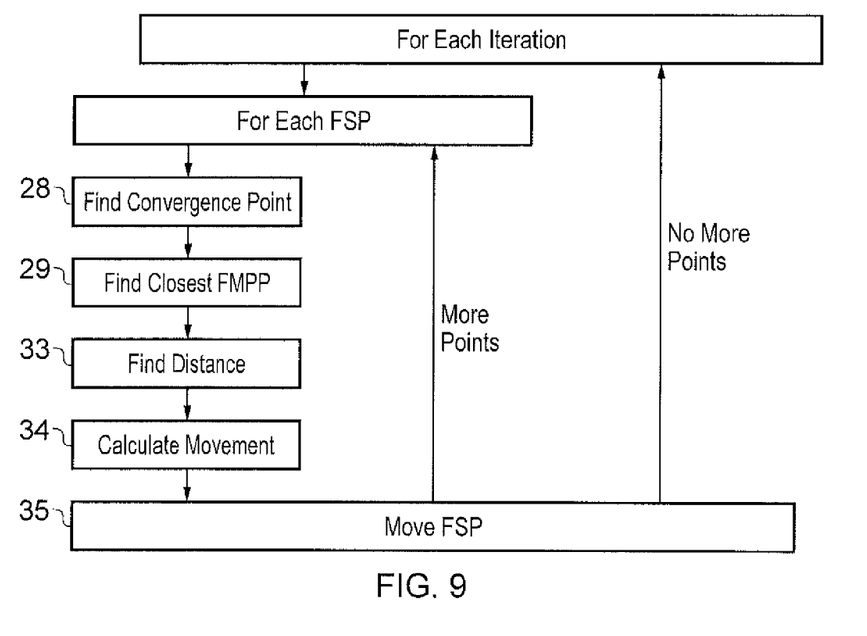
FIG. 9 is a flow diagram representing an iterative primary convergence process which may be carried out on the forming shape points so that they are moved towards the convergence line.

For each iteration of the primary convergence process, the convergence point 24 is found for each forming shape point ("FSP") 19, as denoted at 28 in FIG. 9. It is then necessary to find the nearest final machined part point ("FMPP") 5 to each forming shape point 19, as denoted at 29 in FIG. 9. This is done via an algorithm which identifies the final machined part point 5 which is closest in absolute distance to the particular (forming) shape point of interest ("POI"):

Absolute Distance=|POI−FMPP|

Figure 10:
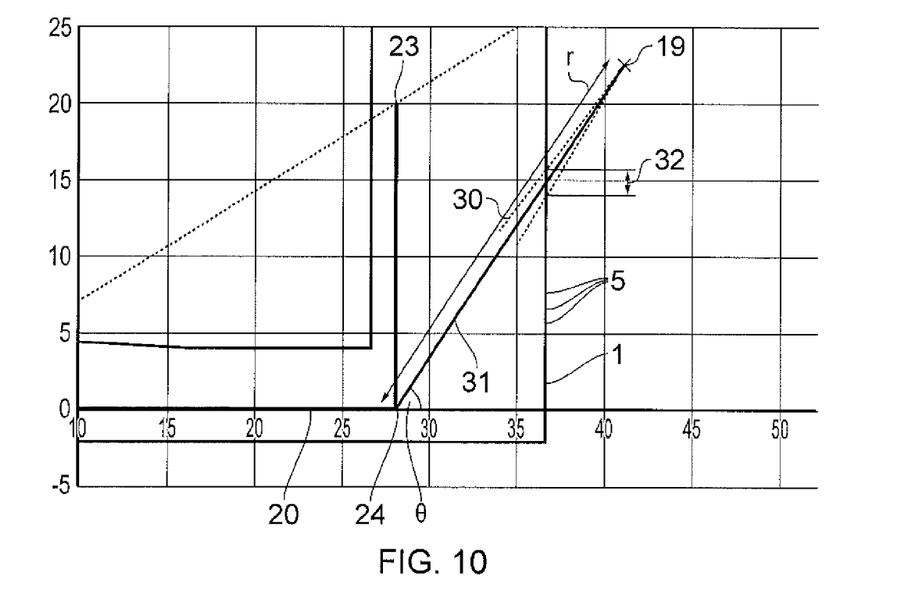
FIG. 10 is a schematic illustration showing principles involved in determining a distance pertaining to the primary convergence process shown in FIG. 9

However, the nearest final machined part point 5 is only selected from those which lie within a 3 degree cone 30 of the notional line 31 between the forming shape point 19 of interest and its respective convergence point 24, as illustrated schematically in FIG. 10, where the eligible final machine part points 5 are those falling within zone 32. This process simply involves an exhaustive search through all of the final machined part points 5, checking whether or not the dot product of the vector from the forming shape point 19 of interest to the convergence point 24 and the vector from the forming shape point 19 of interest to the final machined part point 5.

When the closest eligible final machined part point 5 each forming shape point 19 has been identified, the distance between the two is then calculated as indicated at 33 in the flow diagram of FIG. 9. The distance which each forming shape point 19 should then be moved towards its convergence point 24, along its notional line 31 is then calculated, being ten units less than the linear distance between the forming shape point 19 and its nearest eligible final machined part point 5, as indicated at 34 in FIG. 9. The forming shape points 19 are then moved accordingly, as indicated at 35 in FIG. 9 to complete the iteration. It is to be noted in this regard that whilst the distance moved by each forming shape point 19 is calculated on the basis of its distance from its nearest eligible final machined part point 5, each forming shape point 19 is actually moved along its notional line 31. In the example used, the distance moved by each forming shape point 19 is set at ten units less than the distance between the respective forming shape point 19 and its nearest eligible final machined part point 5 so that even a very course mesh of the final machined part points 5 (for example less than 20 units) will not allow the forming shape point 19 to move past the meshed final part shape 1. It is to be appreciated that care should be exercised when defining the actual proportion of the distance between each forming shape part 19 and its nearest final machined part point 5 which is used for movement of the forming shape points 19, on the basis of the intended size of the final machined part. The example of ten units given is intended to be representative of a suitable degree of movement appropriate to estimate the precursor shape of a moderately sized gas turbine component such as the annular casing component illustrated, but a larger degree of movement may be appropriate for larger components.

Primary convergence is continued in the manner described above and illustrated in FIG. 9 until the forming shape points 19 stop moving.

Figure 12:
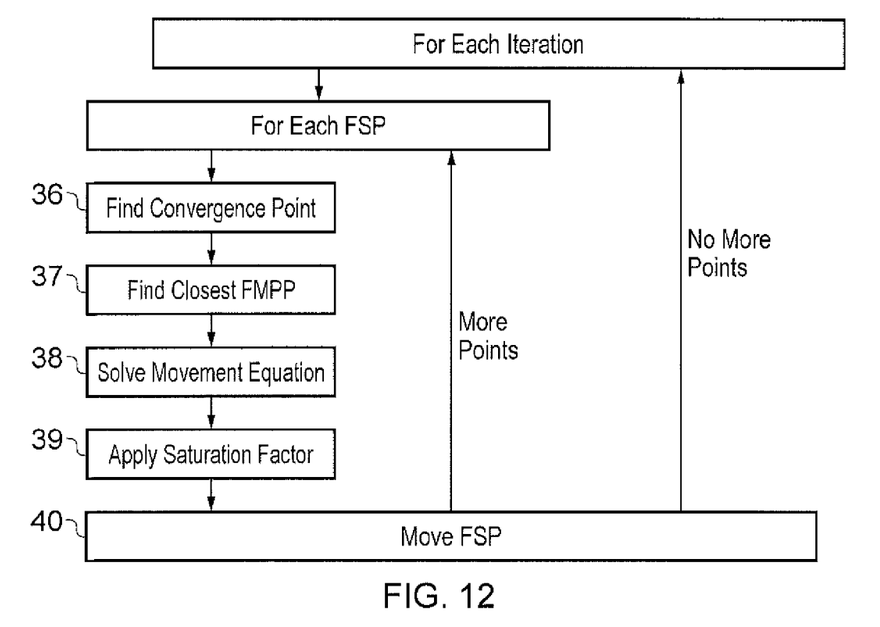
FIG. 12 is a flow diagram representing the secondary convergence process.

Following primary convergence of the forming shape points 19 as explained above for an appropriate number of iterations, the forming shape points 19 are then moved further via a secondary convergence process, as depicted in the flow diagram of FIG. 12. The secondary convergence process is performed for a considerably larger number of iterations that the primary convergence process and typically for between 500 and 1000 iterations.

Conceptually, the secondary convergence process represents a balance between convergence forces and inverse squared repulsion from each forming shape point's nearest eligible final machined part point 5 (determined in the same manner as described above). Each point 19 is thus drawn along its respective notional lines 31, relative to its respective convergence point 24 according to:
 a force ($F_1$) pulling the point 19 towards its convergence point 24;
 a force ($F_2$) pulling the point 19 towards its nearest eligible final machined part point 5; and
 an inverse squared force ($F_3$) pushing it away from its nearest eligible final machined part point 5.

Figure 11:
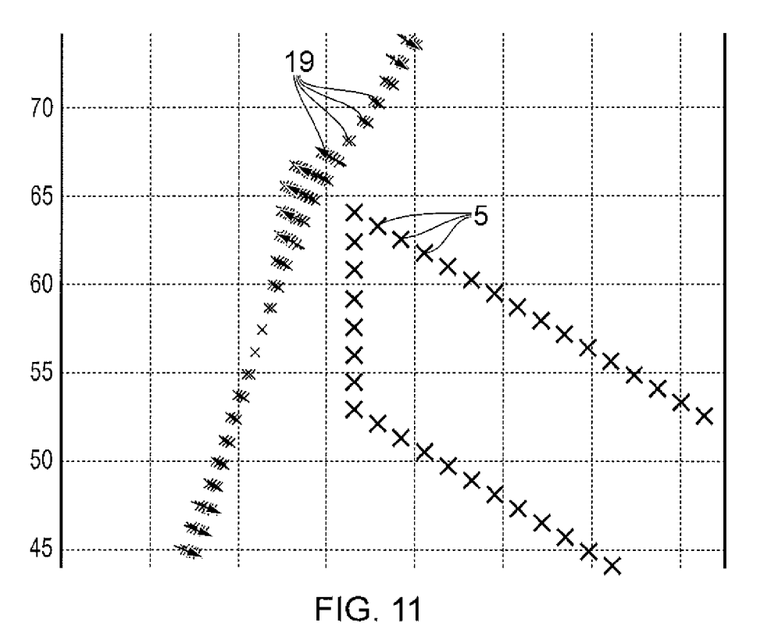
FIG. 11 is a schematic illustration, in enlarged view, depicting characteristics of an iterative secondary convergence process to move the forming shape points towards or away from the convergence line.

Having regard to FIG. 11, it will thus be noted that this characteristic of the secondary convergence process serves to pull the forming shape points 19 which are relatively distant to their nearest eligible final machined part points 5 inwardly towards the convergence line 20, whilst pushing the forming shape points 19 which are relatively close to their nearest eligible final machined part points 5 outwardly and away from the convergence line 20, as indicated schematically by the arrows in FIG. 11.

For each iteration of the secondary convergence process, the convergence point 24 is found for each forming shape point ('FSP') 19, as denoted at 36 in FIG. 12. It is then again necessary to find the nearest eligible final machined part point ("FMPP") 5 to each forming shape point 19, as denoted at 37 in FIG. 12, and this is achieved in the same manner as described above in connection with the primary convergence process. The movement of each forming shape point 19 will then be determined via a movement algorithm, as denoted at 38 in FIG. 12, and the application of a saturation factor, as denoted at 39, as will be described in more detail below.

Where $\hat{n}$ denotes a unit vector from a forming shape point 19 towards its convergence point 24, L denotes the location of the forming shape point 19 in the Cartesian coordinate system 16, $M_p$ denotes the position of the nearest eligible final shape point 5, and $C_p$ denotes the location of the convergence point 24, then it follows that:

$$c_p = \begin{pmatrix} x_c \\ y_c \\ 0 \end{pmatrix}$$

where $C_p$ represents the co-ordinates of the convergence point 24

$$L = c_p + r \cdot \begin{pmatrix} \sin(\text{theta}) \\ \cos(\text{theta}) \\ 0 \end{pmatrix}$$

where L represents the Cartesian location of the forming shape point 19

$n = c_p - L$ where n represents the vector from the forming shape point 19

$$\hat{n} = \frac{n}{|n|}$$

The unit vector of n $B = L - M_p$

Where B represents the vector from the final machined part point 5 to the forming shape point 19

$d = |L - M_p|$

The magnitude of B $\hat{D} = B/d$

The unit vector of B

The forces $F_1$, $F_2$, and $F_3$ mentioned above may be expressed thus:

$$F_1 = \hat{n} \cdot k_1$$

$$F_2 = \dot{D} \cdot k_2$$

$$F_3 = k_3 \dot{D}/d^2$$

Where k1, k2, and k3 is are empirically derived coefficients whose values will depend on which particular manufacturing process is to be used for production of the part, and thus for which manufacturing process the precursor shape is to be estimated. It will therefore be noted that the values for k1, k2, and k3 will be different for a casting process than for a roll-forging process for example.

So:

$$F = \sum_{n=1}^{3} F_n$$

The required distance m by which each forming shape point must be moved along its notional line 31 may thus be expressed as:

$$m = (F \cdot \hat{n})$$

And so each forming shape point 19 is thus moved accordingly, as denoted at 40 in FIG. 12. The secondary convergence process is repeated iteratively until the forming shape points 19 stop moving with each iteration.

Some exemplary values for the coefficients k1, k2, and k3 for casting, die forging and roll forging are set out in the table below:

|  | Casting | Die Forging | Roll Forging |
|---|---|---|---|
| $k_1$ | 1 | 1 | 1 |
| $k_2$ | −1 | −1 | −1 |
| $k_3$ | 5 | 50 | 60 |

Saturation limits can be placed to reduce movement where it exceeds a value x (either positive or negative). Where x is reduced linearly to zero at the end of secondary convergence. This is to inhibit the creation of numerical instability which is inherent in Euler integration analysis of second or higher order systems. Without placing saturation limits in this manner, the forming shape points 19 can develop a tendency to oscillate along their notional movement lines 31. If the movement vector is too large, it is capped at a value x which will depend on the progress through the convergence process. The cap may be either positive or negative depending on the direction or required movement of the forming shape point 19. The value x is reduced throughout the convergence. A large movement of the forming shape point 19 may be tolerated at the beginning of the process to allow rapid convergence, but may be reduced towards the end of the process in order to damp out unwanted oscillations of the forming shape point 19. The movement of the forming shape points 19 may also be restricted if any individual movement may shift a forming shape point 19 past the final machined part points (i.e. effectively into the finished part geometry), which may arise if the mesh of the final machined part points 5 is too coarse and/or the value of the coefficient k3 is too low. If the computed movement of the forming shape point 19 is greater than the distance d, then the movement will be set to d/10.

Figure 14:
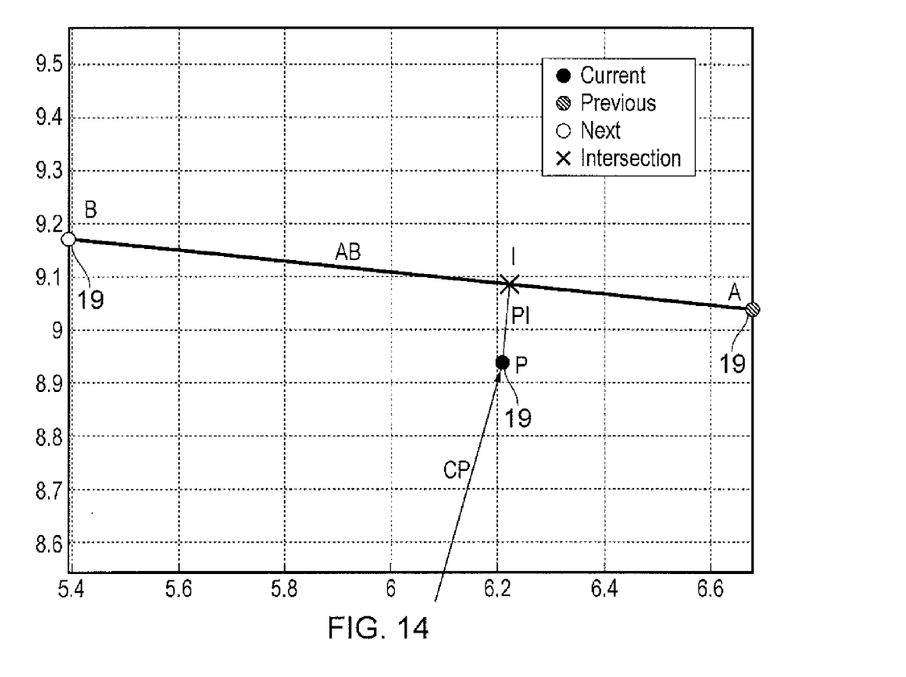
FIG. 14 illustrates details of the tertiary convergence process in respect of an individual forming shape point.

Following secondary convergence of the forming shape points 19 as explained above for an appropriate number of iterations, the forming shape points 19 are then moved further via a tertiary convergence process, as depicted in the flow diagram of FIG. 14, which may be considered to be a smoothing process.

The tertiary convergence process is again iterative and is performed until the forming shape points 19 stop moving with each iteration or until a preset counter is reached (for example 1000 since some forming shape points 19 may have a movement vector perpendicular to the required movement direction). The tertiary convergence process is effective to increase the radius r (along the notional line 31 from the forming shape point to its convergence point) of any forming shape point 19 which is found to lie too far inside a notional line interconnecting the neighbouring forming shape points 19 on either side, thereby moving the point 19 outwardly relative to its convergence point 24.

Figure 13:
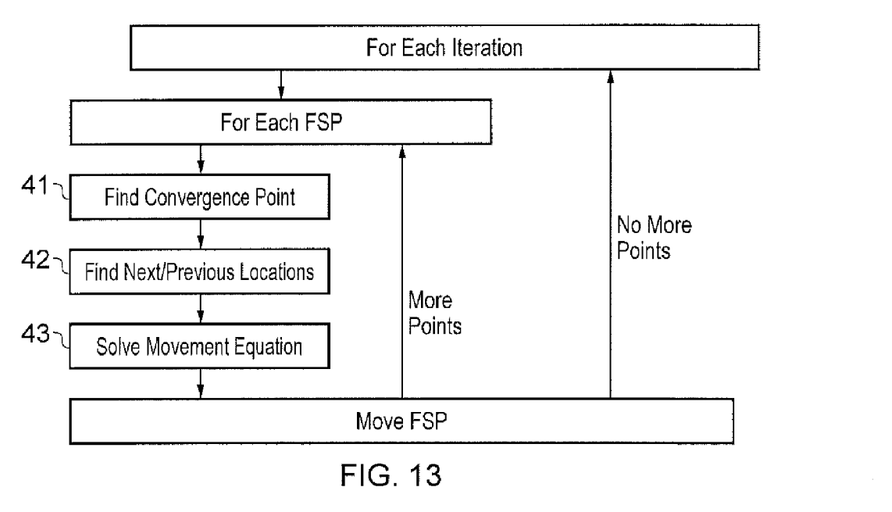
FIG. 13 is a flow diagram representing a tertiary convergence process.

As will be noted from FIG. 13, the tertiary convergence process again involves finding the convergence point 24 for each forming shape point ('FSP') 19, as denoted at 41 in FIG. 13. It is then necessary to find the locations of the neighbouring forming shape points 19 to each side of the forming shape point 19 of interest, as denoted at 42 in FIG. 13, after which a smoothing algorithm is solved for the point, as denoted at 43, in order to determine whether or not the point should be moved outwardly from its convergence point 24.

The manner in which this is achieved may be understood having regard to FIG. 14, in which the forming shape point 19 of interest is denoted as P, and the two neighbouring forming shape points 19 to each side of the point of interest are denoted A and B respectively. The vector between the two neighbouring points A and B is found and a line AB is drawn between the two neighbouring points. The shortest vector, denoted by PI in FIG. 14, between the forming shape point of interest P and the line AB is then calculated. The allowable magnitude (M) of vector PI is defined by:

$$M = k_4 \cdot |AB|$$

where $k_4$ is an empirically derived coefficient whose value will depend on which particular manufacturing process is to be used for production of the part, and thus for which manufacturing process the precursor shape is to be estimated. By way of example, $k_4 = 1$ for a casting process; $k_4 = 0.005$ for a die forging process; and $k_4 = 0.005$ for a roll forging process.

Vector CP shown in FIG. 14 denotes a vector from the forming shape point's convergence point 24 to the forming shape point itself. If the dot product of vector PI and vector CP is negative, then the forming shape point of interest P will lie within the line AB relative to its convergence point 24. If this is the case, and if the magnitude of vector PI is greater than the allowable amount M, as calculated above, then the forming shape point P will be moved outwardly, further away from its convergence point 24, along its position vector until PI no longer exceeds M. In this regard, it is proposed to move the forming shape point outwardly by a distance equal to 0.999M−|PI|. This expression ensures that, when used iteratively the point P will lie just inside the acceptable region, provided that the movement vector is not perpendicular to the required direction of travel.

Figure 15:
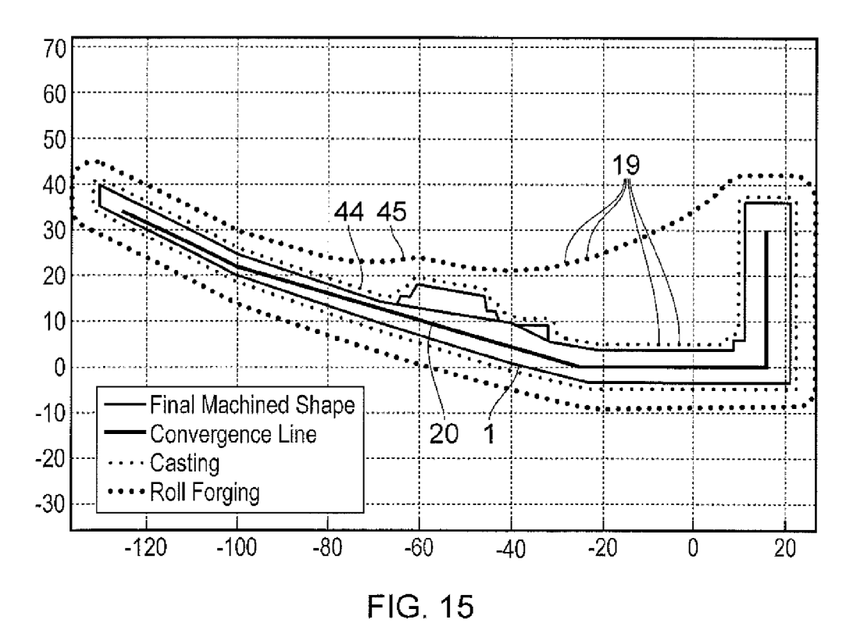
FIG. 15 is a schematic illustration showing alternative precursor shapes for a part to be produced by casting and roll forging.

Tertiary convergence (smoothing) continues as explained above, in an iterative manner, until there is no longer any movement of the forming shape points 19. At this point, the forming shape points 19 will collectively define the outline of an approximately optimised precursor shape which can be produced by the chosen manufacturing process, and which will require minimum subsequent machining to achieve the final part shape 1. FIG. 15 illustrates exemplary precursor shapes achieved via the method explained above for casting and for roll-forging, relative to the final part shape 1 and the convergence line 20. Outline shape 44 represents an exemplary precursor shape for casting, and outline shape 45 represents an exemplary precursor shape for roll-forging. As will be noted, the precursor shape 44 for casting is considerably closer to the final part shape 1 than is the precursor shape 45 for roll-forging.

Figure 16:
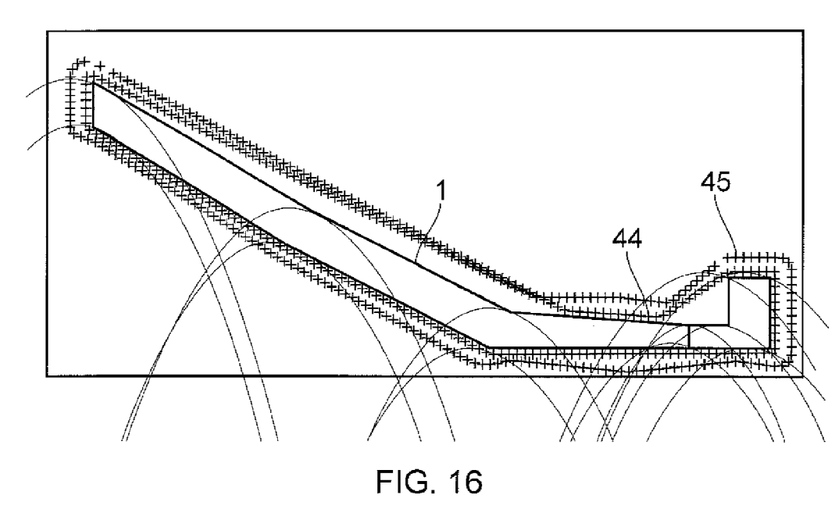
FIG. 16 shows the resulting precursor shape imported into a CAD package as a sketch.

Following estimation of the precursor shapes 44, 45 via the method described above, the precursor shapes will then be imported back into the CAD package which was originally used to create the final part shape 1, as illustrated in FIG. 16. The CAD package can then be used to calculate the dimensions of the precursor shapes 44, 45 automatically, so that the dimensions can then be used in the chosen production process to achieve the precursor shape.

FIG. 7 illustrates an exemplary part 2, whose 2-dimensional precursor shape 46 may be estimated via the method described above. It is to be appreciated that whilst the method has been described above with specific reference to the estimation of a 2-dimensional precursor shape, the method can also be used to estimate a 3-dimensional precursor shape.

As will be appreciated, the above-described method is suitable for implementation on a computer.

Figures 17, 19:
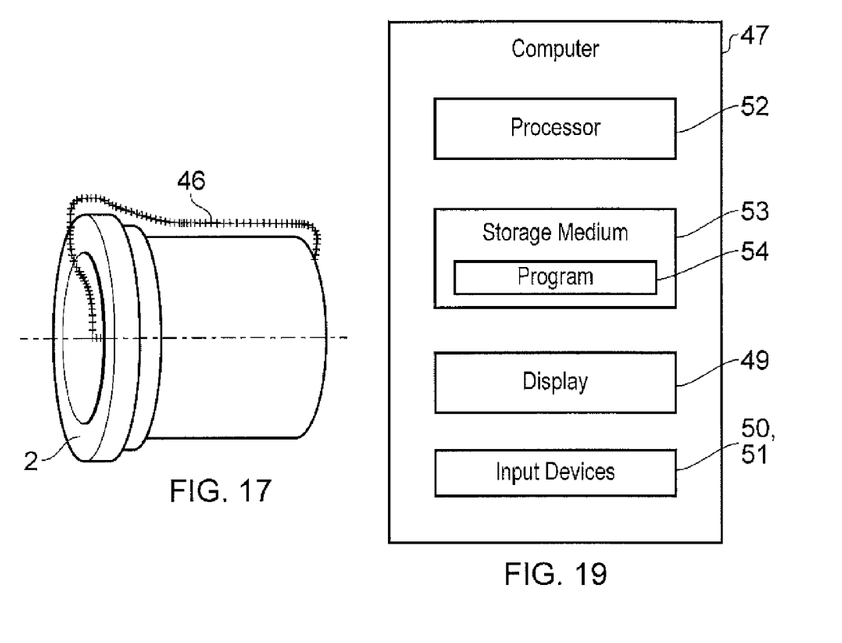
FIG. 17 shows a component whose two-dimensional shape may be estimated as a precursor shape via the proposed method.
FIG. 19 is a schematic drawing showing elements of the computer apparatus illustrated in FIG. 18.
Figure 18:
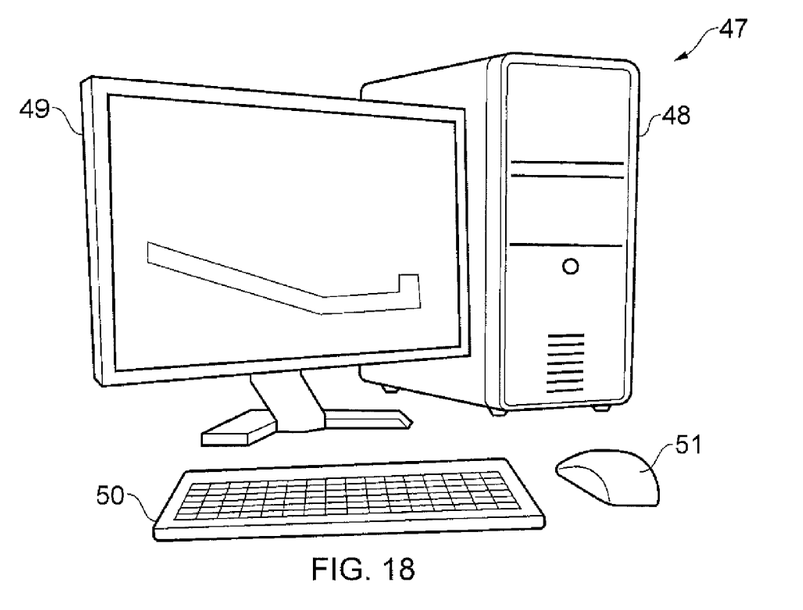
FIG. 18 is a schematic drawing showing a computer apparatus which may be configured to perform the method.

FIG. 18 illustrates an exemplary computer apparatus 47 which may be configured to implement and run the above-described method. The computer apparatus illustrated is shown in the form of a conventional desktop computer, and thus comprises a system unit 48 to which are connected a display unit 49, and input devices in the form of a keyboard 50 and a mouse 51. Having regard to FIG. 19, the computer apparatus 47 may comprise one or more processors 52 configured to perform the above-described method. The computer apparatus 47 may also comprise, or be configured to receive, a storage medium 53. The storage medium is a non-transitory computer readable storage medium which can take any convenient form, but which excludes merely transitory or propagating signals. The storage medium 53 contains computer readable instructions in the form of a computer program 54 which, when read by the computer 47 via its processor 52, cause performance of the above-described method.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention.

The invention claimed is:

1. A method of manufacturing a precursor shape for a part suitable for manufacture via a process selected from a plurality of manufacturing processes, the method comprising:
(i) estimating the precursor shape by:
generating a convergence line within confines of a final part shape;
providing an array of spaced-apart forming shape points around the final part shape;
converging the shape points towards the convergence line using a force-energy-balance technique via a movement algorithm; and
applying a smoothing algorithm to the converged points to create an estimated precursor shape,
the algorithms including coefficients specific to a predetermined one of the plurality of manufacturing processes;
(ii) importing the estimated precursor shape into a CAD package; and
(iii) manufacturing the precursor shape by way of the predetermined one of the manufacturing processes using dimensions calculated from the CAD package.

2. The method according to claim 1, wherein the estimating the precursor shape further comprises selecting the predetermined one of the manufacturing processes from the plurality of manufacturing processes.

3. The method according to claim 1, wherein the estimating the precursor shape further comprises defining the final part shape prior to the generation of the convergence line.

4. The method according to claim 1, wherein the generation of the convergence line is performed manually.

5. The method according to claim 1, wherein the generation of the convergence line is performed automatically by a computer.

6. The method according to claim 1, wherein ends of the convergence line are proximate to, but spaced inwardly of, the final part shape.

7. The method according to claim 1, wherein the providing of the array of spaced-apart forming shape points is one of: automated; manual; and partially automated.

8. The method according to claim 1, wherein each of the forming shape points is assigned a respective angular value ($\theta$) between 0° and 360°.

9. The method according to claim 1, wherein an angular value ($\theta$) of each forming shape point remains constant throughout the convergence and smoothing steps.

10. The method according to claim 1, wherein the final part shape and the convergence line are provided within a Cartesian coordinate system such that an origin of the coordinate system falls within the final part shape.

11. The method according to claim 1, wherein a plurality of the forming shape points are moved relative to respective convergence points during the convergence and smoothing, the convergence points being located at discrete positions along the convergence line.

12. The method according to claim 11, wherein the convergence point, relative to which each of the plurality of forming shape points is moved during the convergence and smoothing, is determined solely in dependence on an angular value ($\theta$) assigned to the respective forming shape point.

13. The method according to claim 1, wherein:
a plurality of the forming shape points are moved relative to a same, shared, convergence point, and the shared convergence point is coincident with an end of the convergence line.

14. The method according to claim 1, wherein the estimating the precursor shape further comprises applying an adaptive grid spacing to maintain the forming shape points in approximately equi-spaced relation to one another during the convergence and smoothing.

15. The method according to claim 1, wherein:
the convergence of the forming shape points involves a primary convergence stage followed by a secondary convergence stage,
the primary convergence stage is performed independently of whichever one of the plurality of manufacturing processes is selected for manufacture of the part, and
the secondary convergence stage involves application of the movement algorithm.

16. The method according to claim 1, wherein the movement algorithm includes a plurality of the coefficients.

17. The method according to claim 1, wherein the smoothing algorithm includes a single said coefficient.

\* \* \* \* \*